United States Patent [19]

Horvath

[11] Patent Number: 4,491,224
[45] Date of Patent: Jan. 1, 1985

[54] WELDABLE TEAR-OFF CAPPING FILM FOR SEALING PACKAGES

[75] Inventor: Laszlo S. Horvath, Geneva, Switzerland

[73] Assignee: C O D Inter Techniques SA, Geneva, Switzerland

[21] Appl. No.: 435,920

[22] Filed: Oct. 22, 1982

[30] Foreign Application Priority Data

Mar. 5, 1982 [CH] Switzerland .......................... 1339/82

[51] Int. Cl.³ .............................................. B65D 35/16
[52] U.S. Cl. ..................................... 206/484; 206/604; 206/608; 206/611; 206/620; 229/7 R
[58] Field of Search ....................... 206/484, 484.2, 604, 206/605, 606, 608, 611, 612, 615, 620, 613, 623, 634; 220/257, 258; 229/7 R

[56] References Cited

U.S. PATENT DOCUMENTS

| 3,083,861 | 4/1963 | Amberg et al. |
| 3,158,491 | 11/1964 | Farrell et al. |
| 3,183,800 | 5/1965 | Farrell et al. ..................... 206/612 |
| 3,204,760 | 9/1965 | Whiteford ........................... 206/484 |
| 3,298,505 | 1/1967 | Stephenson . |
| 3,410,395 | 11/1968 | Sellers . |
| 3,432,087 | 3/1969 | Costello . |
| 3,547,257 | 12/1970 | Armentrout . |
| 3,716,180 | 2/1973 | Bemiss et al. |
| 3,762,985 | 10/1973 | Chaitman ........................... 206/620 |
| 3,776,450 | 12/1973 | Christensson .................... 206/620 |
| 3,806,618 | 4/1974 | Bemiss . |
| 3,836,039 | 9/1974 | Seifert et al. ..................... 206/612 |
| 3,924,746 | 12/1975 | Haines ............................... 206/484 |
| 3,946,780 | 3/1976 | Sellers . |
| 4,055,672 | 10/1977 | Hirsch et al. |
| 4,063,383 | 12/1977 | Green . |
| 4,096,948 | 6/1978 | Kuchenbecker . |
| 4,136,769 | 1/1979 | Dubois et al. |
| 4,160,852 | 7/1979 | Torterotot et al. ............... 206/484 |
| 4,234,084 | 11/1980 | Hutten ............................... 206/484 |
| 4,351,473 | 9/1982 | Manizza ............................ 206/612 |

FOREIGN PATENT DOCUMENTS 2109940 10/1971 Fed. Rep. of Germany .
2318028 11/1973 Fed. Rep. of Germany .
1333994 11/1963 France .
2025894 1/1980 United Kingdom .

Primary Examiner—Joseph Man-Fu Moy
Assistant Examiner—David Fidei
Attorney, Agent, or Firm—Pennie & Edmonds

[57] ABSTRACT

A weldable capping film for tear-off closure caps on containers or packages, comprising a combination of a film of low elasticity and a thermoplastic film, and serving to seal the containers or packages hermetically when welded thereto.

9 Claims, 5 Drawing Figures

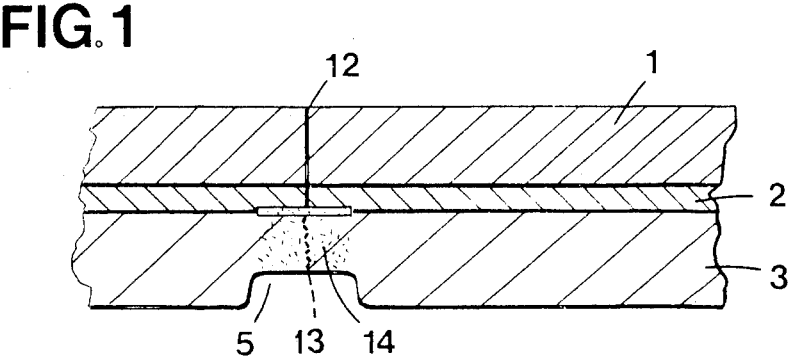
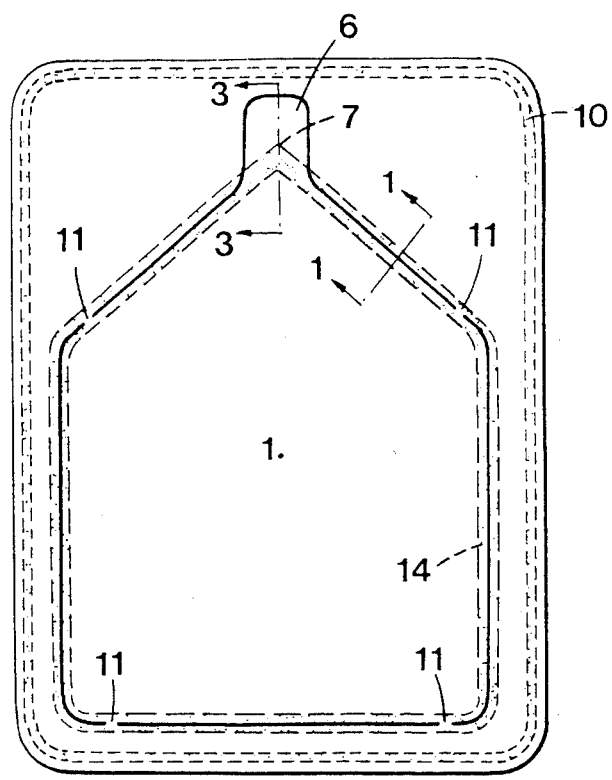

WELDABLE TEAR-OFF CAPPING FILM FOR SEALING PACKAGES

SUMMARY OF THE INVENTION

The invention refers to a weldable capping film for tear-off closure caps on containers or packages, comprising a combination of a film (1) of low elasticity made of metal, plastic, paper or other material and a thermoplastic film (3), and serving to seal the containers or packages when welded thereto.

The invention refers more particularly to a weldable capping film defined hereinabove, characterized in that an incision is made in the film (1) and a thermoplastic adhesive layer (2) bonded thereto, the contour of the incision functioning as a predetermined rupture line (12) for tearing off the combination capping film which hermetically seals the container or package.

BACKGROUND OF THE INVENTION

The object of the invention described hereinafter is a combination capping film for sealing a wide variety of packages intended for conservation of foodstuffs, prevention of oxidation, corrosion or loss of contents, and for other applications where hermetic sealing is essential but where ease of opening must be guaranteed.

Experience has shown that two conflicting requirements must be satisfied for hermetic sealing of packages with capping films: on the one hand, the package must be hermetically sealed even if constituents, for example drops of the contents, fall onto the sealing area during filling, but on the other hand, the user must be able to remove the capping film in order to open the package. If the sealing seam is sealed under high temperature and pressure, some of the contents may be extruded through the sealing area; this ensures satisfactory sealing, but the desired peel effect, which facilitates opening by the user, is thereby impaired. This problem is frequently encountered when opening ordinary yoghourt beakers.

However, sealing of packages by adjustable parameter which guarantee maximal ease of opening results in extrusion of greater quantities of material during processing and in imperfectly sealed goods.

The invention described hereinafter is designed, on the one hand, to eliminate conflicting sealing requirements (hermetically sealed seam/peel effect) and on the other to facilitate opening of the package by the user.

PREFERRED EMBODIMENTS OF THE INVENTION

This objective is achieved by the provision of two mutually independent solutions to the conflicting requirements, i.e. tight, leakproof sealing and ease of opening. The sealing seam can thus be a true weld seam, opening being ensured within the welding line by means of a predetermined rupture line in the combination capping film. The basic operational principle of this invention is in no way contingent on the geometrical characteristics of the package or other object to be sealed.

BRIEF DESCRIPTION OF THE DRAWINGS

FIG. 1 shows the section 1—1 of the capping film in accordance with the present invention depicted in FIG. 2 which illustrates the principle of embodiment of the capping film.

The outermost film (1) consists of a material of low elasticity, such as aluminium, paper, suitable plastics or other film materials of low elasticity. The film (1) is coated with a thin adhesive layer of the same thermoplastic material as the innermost film (3). In a preliminary operation, an incision is made in the film (1) and the adhesive layer (2), the contour of the incision forming a predetermined rupture line along which tearing will occur. The number of possible embodiments of the contour, one of which is depicted in FIG. 2., is almost infinite.

Figure 3:
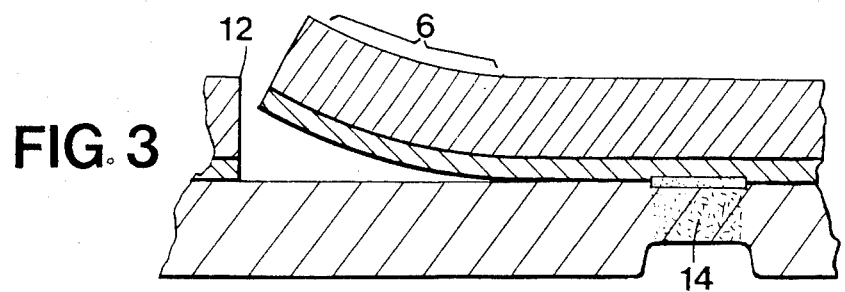

FIG. 3 is a section 3—3 of the capping film in accordance with the present invention shown in FIG. 2.

Figure 4:
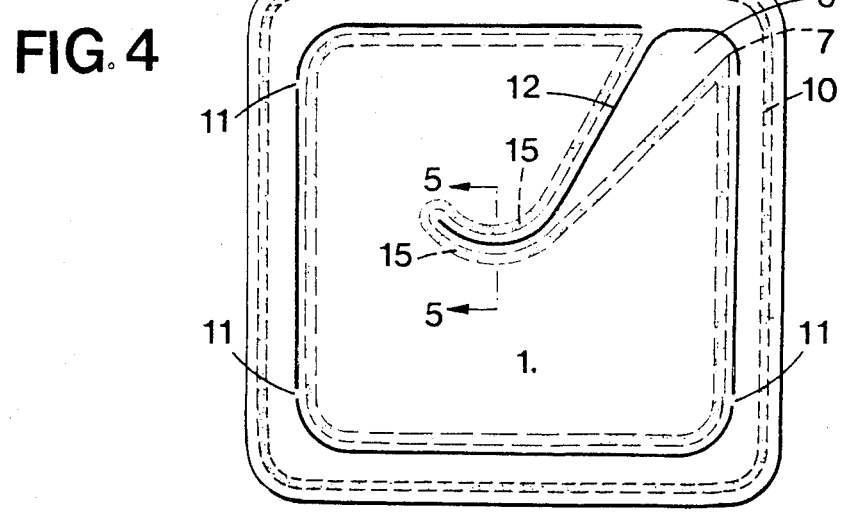

Another possible embodiment of the contour is shown in FIG. 4.

Following establishment of the predetermined rupture line (12), the film (1) is welded to the film (3) by means of the adhesive layer (2). The welding line (14), represented by the lightly shaded area in FIGS. 1, 2 and 3 and by the recess (5) in the sectional view in FIGS. 1 and 3, covers the predetermined rupture line (12) over most of its length, with the exception of the opening tab (6). In this region, a point (7) from which tearing will begin is formed. In the region of the opening tab (6), the contour deviates from the predetermined rupture line (12) and the opening tab is not welded to the film (3). The film (3) may also be a multilayer composite film. Like the majority of films manufactured by blow moulding, the film (3) possesses a biaxial molecular orientation. During welding, the thermoplastic is fused to the film, thereby destroying most of the molecular orientation to which the tearing strength of the film is largely due.

This zone of reduced strength is represented by the lightly shaded area (14) in FIGS. 1 and 3. The weld area is further weakened by a recess formed by the sealing pressure during welding. Notching produced, for example, by ridges or other surface patterns on the welding tool, may induce even further weakening.

The line (10) in FIGS. 2 and 4 represent the weld line along which the combination capping film is welded to the container (not shown).

The predetermined rupture line (12) is punctuated at suitable intervals by small bridges (11). These bridges (11) prevent detachment of that section of the film circumscribed by the predetermined rupture line (12). Whenever the processing technology permits, the bridges (11) may be dispensed with.

The capping film is torn off by gripping the opening tab (6) with the fingers and first tearing off the point. The tear is then extended along the predetermined rupture line (12) in the film until that section of the film circumscribed by the predetermined rupture line (12) is torn off. During tearing, the weld area (5) is torn along the actual tearing line (13).

As an alternative solution, the weld contour may be executed according to FIG. 4, whereby the film (3) is welded to the film (1) by the adhesive layer (2) along a weld line (15) and the predetermined rupture line (12) is not covered by the weld seam.

Figure 5:
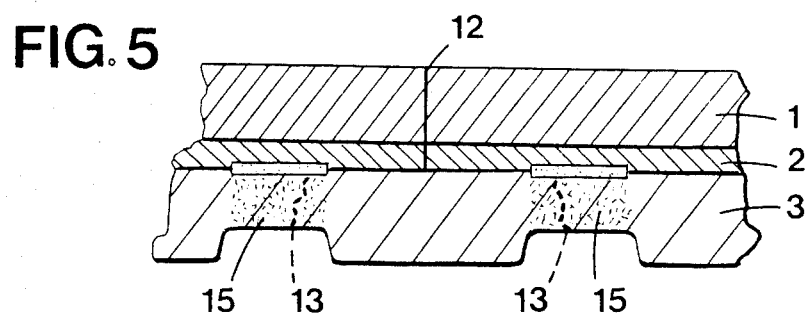

FIG. 5 is a section 5—5 of the capping film in accordance with the present invention illustrated in FIG. 4.

The invention guarantees separation of the two functions: tight, hermetic sealing of a package of thermoplastic packaging material and easy opening. The sealing seam can be a true weld seam, opening being achieved along a predetermined rupture line represented, on the one hand, by a weld seam between the elements of the combination capping film and, on the other hand, by the contour of an incision made in the outermost, non-elastic element of the combination capping film before sealing.

What I claim is:

1. A frangible package cover comprising:
   (a) an outside film;
   (b) a thermoplastic adhesive layer on an inside surface of the outside film,
   (c) the thermoplastic adhesive layer and the outside film having a rupture line extending completely through said thermoplastic adhesive layer and outside film, the rupture line being spaced from the outside perimeter of the outside film and the thermoplastic adhesive layer; and
   (d) and inside, plastic film secured to the outside film via the thermoplastic adhesive layer and having an uncut weakened zone extending directly below or adjacent substantially the entire rupture line, whereby the weakened zone of the inside film is torn as the outside film is pulled apart along the rupture line.

2. A frangible package cover according to claim 1 wherein the inside film possesses a biaxial molecular orientation except in the weakened zone where there is reduced molecular orientation.

3. A frangible package cover according to claim 1 wherein the weakened zone comprises a weld path formed as the inside film is welded to the outside film via the thermoplastic adhesive layer.

4. A frangible package cover according to claims 1, 2 or 3 wherein:
   (a) a portion of the rupture line extends away from the weakended zone of the inside layer to form an opening tab; and
   (b) the portion of the outside film between the weakened zone of the inside film and the perimeter of the opening tab is not welded to the inside film to facilitate pulling the opening tab away from the inside film.

5. A frangible package cover according to claims 1, 2 or 3 wherein the rupture line is located directly above most of the weakened zone.

6. A frangible package cover according to claims 1, 2 or 3 wherein the rupture line is located adjacent to and slightly spaced from most of the weakened zone.

7. A frangible package cover according to claims 1, 2 or 3 wherein:
   (a) the cover further includes a closed loop, sealing zone extending adjacent the periphery of the cover for securing the cover to a container; and
   (b) the rupture line is disposed within the area circumscribed by the sealing zone.

8. A frangible package cover according to claims 1, 2 or 3 wherein the outside film comprises a material of low elasticity.

9. A frangible package cover according to claims 1, 2 or 3 wherein the weakened zone of the inside film includes a plurality of notches.

* * * * *